United States Patent [19]
Zwerenz

[11] 3,916,719
[45] Nov. 4, 1975

[54] OPERATING MECHANISM FOR A MOTOR VEHICLE

[75] Inventor: Carl Maria Zwerenz, Vienna, Austria

[73] Assignee: The Upjohn Company, Kalamazoo, Mich.

[22] Filed: Apr. 22, 1974

[21] Appl. No.: 462,983

[52] U.S. Cl. ................ 74/478; 74/512; 74/513; 192/3 S
[51] Int. Cl.² ........................................ G05G 9/02
[58] Field of Search ............ 74/478, 512, 513, 560; 192/1, 3 S

[56] References Cited
UNITED STATES PATENTS

| | | | |
|---|---|---|---|
| 912,494 | 2/1909 | Schorno | 74/478 X |
| 2,640,372 | 6/1953 | Dodge | 74/478 X |
| 2,919,773 | 1/1960 | Fong | 192/3 S |
| 3,029,916 | 4/1962 | Lunt | 74/478 X |

*Primary Examiner*—Samuel Scott
*Assistant Examiner*—F. D. Shoemaker
*Attorney, Agent, or Firm*—Morris L. Nielsen

[57] ABSTRACT

The foot brake of a motor vehicle is combined with a speed control lever pivotal about mutually perpendicular axes. Pivoting about one axis causes braking while pivoting of the lever about the other axis moves it between an idling and a motor speed control position. When the lever is pivoted about the one axis into the braking position, a force is exerted upon the lever to move it from the motor speed control into the idling position, and two limit switches are arranged in the pivoting path of the lever to cause this force to be exerted upon simultaneous energization of one of the switches and de-energization of the other switch.

11 Claims, 16 Drawing Figures

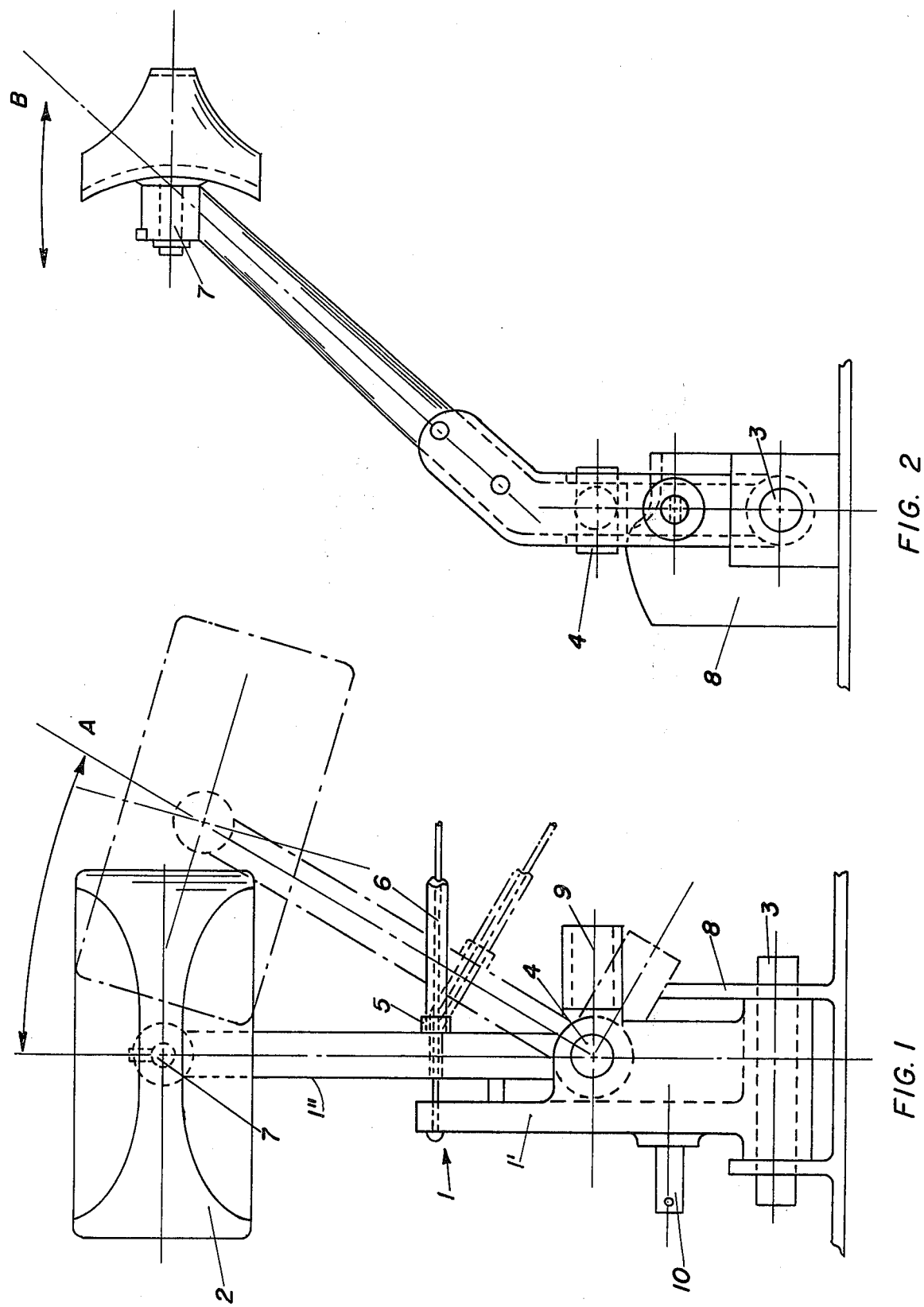

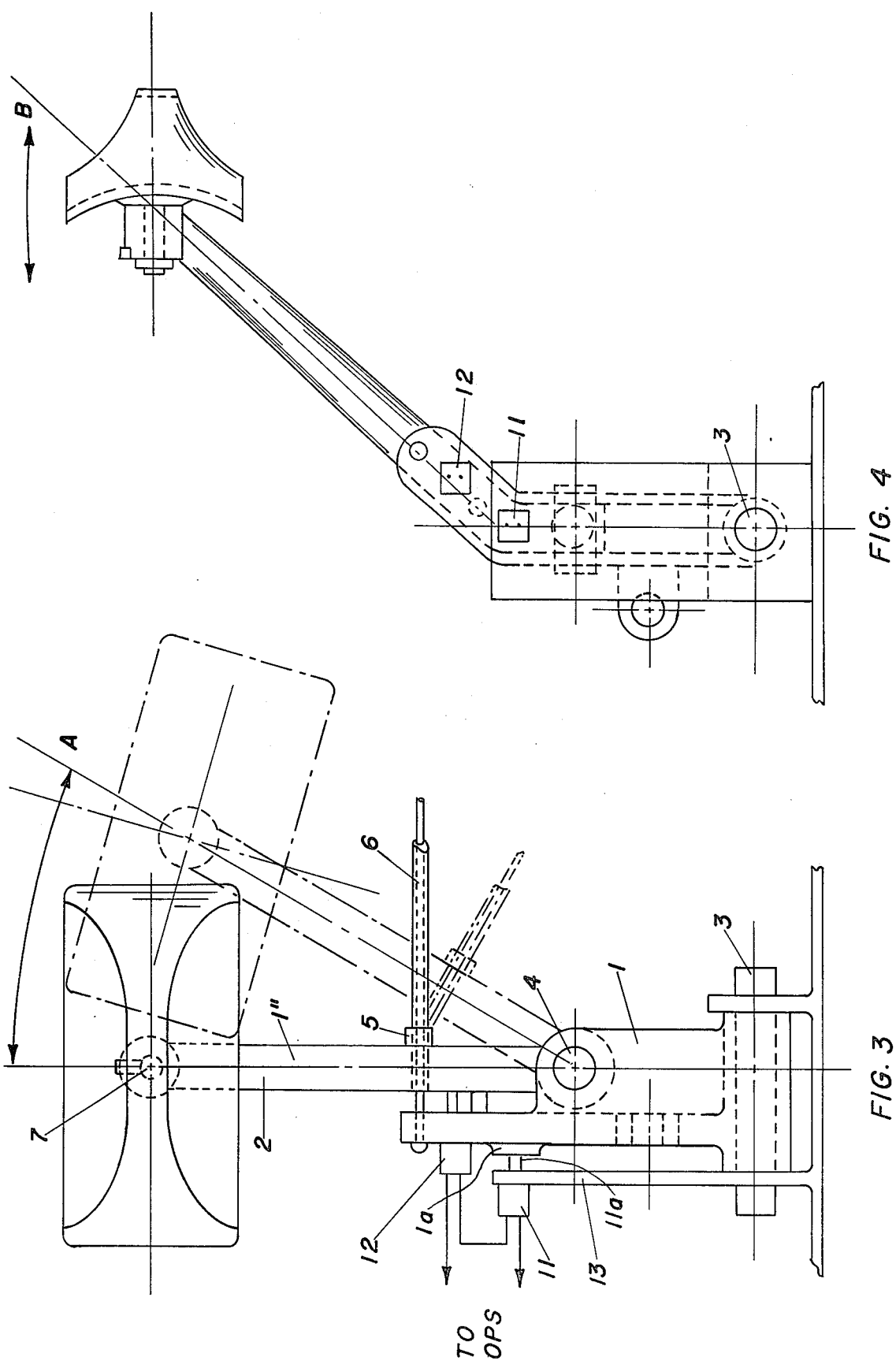

OPERATING MECHANISM FOR A MOTOR VEHICLE

The present invention relates to a new and improved operating mechanism for a motor vehicle wherein the brake pedal and the gas pedal are combined into a single operating lever.

Motor vehicles with manual transmission usually have foot-operated clutch, brake and gas pedals. Normally, the gas and brake pedals are operated by the right foot, the foot being switched between the gas and the brake pedal for driving and braking, respectively. If sudden braking is required, panic of the driver sometimes causes him or her to leave the foot on the gas pedal and depress the same, instead of operating the brake. This results in a sudden spurt of speed instead of braking, leading to possibly serious accidents.

In an effort to avoid such an accidental operation of the gas pedal, motor vehicle operating mechanisms have been proposed wherein a gas pedal is pivotally mounted on a brake pedal. The gas pedal is pivoted to control the motor speed and braking is effectuated by depressing the gas pedal, this movement being transmitted to the brake pedal. This arrangement does not require the right foot to assume two different positions for accomplishing opposite results, i.e. control of the vehicle speed and braking. However, the known operating mechanisms of this type are complex and, therefore, are subject to malfunction.

The simple operating mechanism for a motor vehicle according to this invention comprises a foot-operated brake and motor speed control lever mounted for pivoting about a first axis into a position to brake the vehicle and for pivoting about a second axis extending transversely to the first axis. The lever is pivotal about the second axis between an idling position and a motor speed control position. A return means is arranged to exert a force for pivoting the lever about the second axis or moving it in respect of a motor speed control connected thereto from the motor speed control position to the idling position when the lever is pivoted about the first axis into the braking position.

The above and other features of the invention will become more apparent from the following detailed description of certain now preferred embodiments thereof, taken in conjunction with the accompanying drawing wherein FIG. 1 is a front elevational view of an operating mechanism according to the present invention;

FIG. 2 is a side elevational view of this operating mechanism;

FIG. 3 is a view similar to that of FIG. 1 of a modified embodiment of the operating mechanism;

FIG. 4 is a elevational elvational view of the operating mechanism of FIG. 3;

Figure 5:
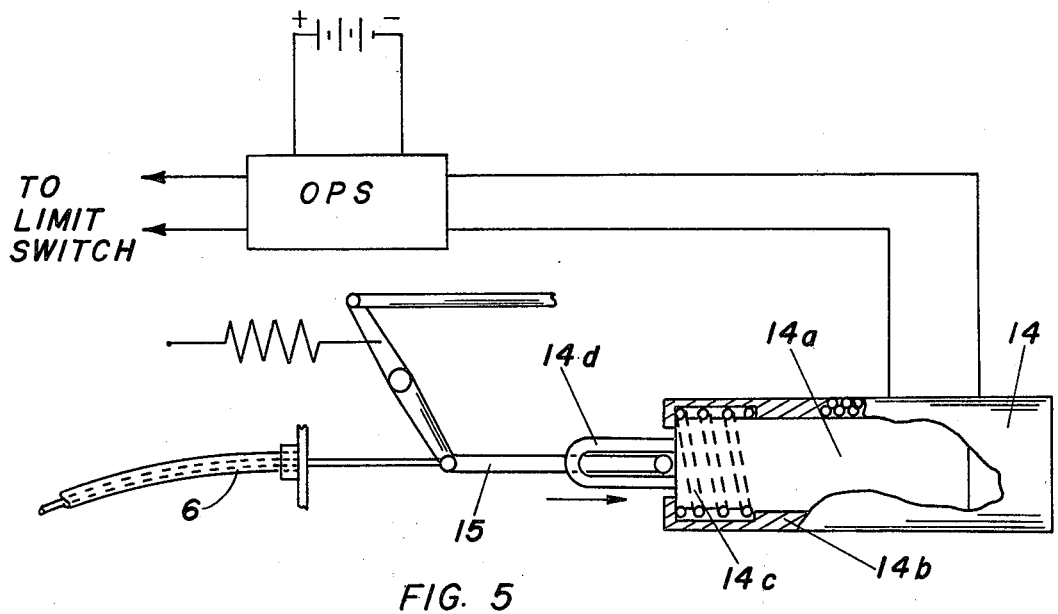
FIG. 5 shows a solenoid return means for the lever.

Referring now to the drawing and first to the embodiment of FIGS. 1 and 2, foot-operated brake and motor speed control (gas) lever 1 is shown to first lever part 1'' and second lever part 1'. Upper lever part 1'' carries pedal 2. The two lever parts are rotatably connected by pivot 4 and an end of lower lever part 1' is rotatable about pivot 3, pivot 3 defining a first axis about which the lever may be pivoted into a position to brake the vehicle by depressing the lever in a direction perpendicular to the plane of the drawing, and pivot 4 defining a second axis extending transversely to the first axis, i.e. in the perpendicular direction, about which the lever may be pivoted laterally in the direction of arrow A between an idling position shown in full lines and a motor speed control position shown in broken lines. In the pivoted position, the lever controls the speed of the motor, for instance the gas flow to an internal combustion engine or the power supply to an electro-motor.

Laterally pivotal upper lever part 1'' carries fitting 5 for connecting one end of a Bowden cable, the other end thereof being connected to lower lever part 1' used as the brake portion of the lever. Bowden cable 6 serves as a transmission of the pivotal movement of lever part 1'' to a suitable motor control.

Pedal 2 is a stirrup into which the operating foot is cradled so as to prevent slippage when the foot is used to pivot lever part 1'' laterally and thus to assure secure execution of this pivoting movement. Pedal 2 is mounted on the upper end of lever part 1'' by pivot 7 whose axis is substantially parallel to the second pivoting axis of the lever and about which the pedal may be pivoted to a limited extent so as to minimize the force needed to pivot lever part 1'' in the direction of arrow A.

To prevent the combined brake-gas pedal hereinabove described from executing both functions, i.e. braking and controlling the vehicle speed, simultaneously, cam 8 is stationarily mounted, for instance on the floor of the vehicle or a side wall thereof, cam 8 having a camming surface centered on first axis 3. Cam follower 9, such as a pin or roller, is mounted on lever part 1'' for gliding cooperation with the camming surface, the latter being so shaped that lever part 1'' is pivoted about second axis 4 into the idling position (full lines in FIG. 1) when the lever is pivoted, i.e. depressed, about first axis 3 into the braking position. Thus, when lever 1 is in the depressed braking position, lever part 1'' is forced by cam and cam follower means 8, 9 into the idling position. The shape of the camming surface is such that lever part 1'' is returned into its idling position, in which it does not control the motor speed, while the pedal is depressed and before it has reached the braking position, being held in the idling position during braking. Pin 10 projecting from brake lever part 1' connects the operating lever to the main brake cylinder by means of a connecting rod.

In the modified embodiment of FIGS. 3 to 5, wherein like reference numerals indicate like parts functioning in a like manner as in FIGS. 1 and 2, the return means for pivoting lever part 1'' into the idling position comprises a solenoid exerting a pivoting force on the lever part. In this embodiment, a first limit switch 11 is mounted on bracket 13 extending upwardly from pivot 3 in the path of pivoting lever part 1' so that it is energized when this lever part is depressed into the braking position of the lever. A second limit switch 12 is mounted on lower lever part 1' in the path of pivoting lever part 1''. In the full-line position shown in FIG. 3, both limit switches are deenergized.

When lever part 1'' is pivoted away from contact 12a of limit switch 12, the switch is energized. Similarly, when pedal 2 is depressed, contact 11a glides off boss 1a on lever part 1' so as to energize limit switch 11. The two limit switches are series connected in a control circuit including operating power switch OPS which switches the operating power of solenoid 14 on and off.

In an emergency situation, if pedal 2 is not returned from its motor control position (shown in broken lines in FIG. 3) to the idling position (shown in full lines) before operating lever 1 has been depressed into its braking position, energization of limit switch 11 by the depression of lever part 1' causes the control circuit to be closed since the other limit switch 12 is energized while motor speed control lever part 1'' is pivoted away from switch 12. Thus, master switch OPS is energized to close the control circuit for solenoid 14. This causes solenoid core 14a to be pulled into solenoid coil 14b against the bias of compression spring 14c. Sliding block 14d moves with the solenoid core and actuates linkage 15 connected therewith, the linkage operating Bowden cable 6 to pivot motor speed control lever part 1'' into its idling position. This prevents delivery of gas to the motor during braking. Once the motor speed control lever part has reached its idling position, it engages contact 12a and thus de-energizes switch 12. This de-energizes the operating power control circuit, and solenoid core 14a moves outwardly of coil 14b under the bias of spring 14c. This arrangement prevents overheating and destruction of the solenoid during a prolonged period of braking.

Figure 6:
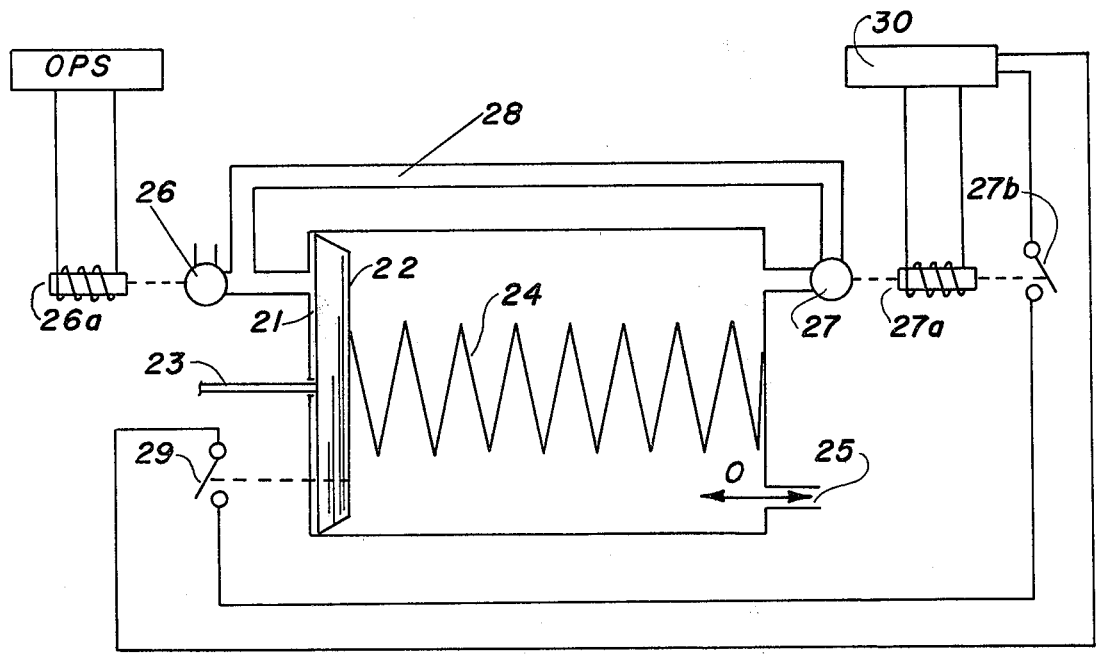
FIG. 6 shows a vacuum operating cylinder return means.

FIG. 6 shows another embodiment of the return means comprising a vacuum operating cylinder 21. Piston 22 with piston rod 23 is arranged to glide in cylinder 21, the piston being biased by compression spring 24. Conduit 25 connects the cylinder to a vacuum source (not shown). The two chambers of the cylinder are interconnected by overflow conduit 28, venting valve 26 operated by solenoid 26a and pressure relief valve 27 operated by solenoid 27a being mounted in conduit 28.

In the rest position of FIG. 6, the same low pressure is present in both chambers of cylinder 21. In this position, switch 29, which is operated by moving piston 22, is open, venting and relief valves 26 and 27 are closed and switch 27b operated by solenoid 27a is open. When the operating power control circuit is closed by actuation of pedal 2 in the same manner as described hereinabove in connection with FIGS. 2 to 5, master switch OPS will energize solenoid 26a to open venting valve 26. This will decrease the vacuum, i.e. increase the pressure, in the cylinder chamber left of piston 22 and cause the piston to be moved rightward against the bias of spring 24, as shown in FIG. 6a. This piston movement causes closure of switch 29.

Figure 6B:
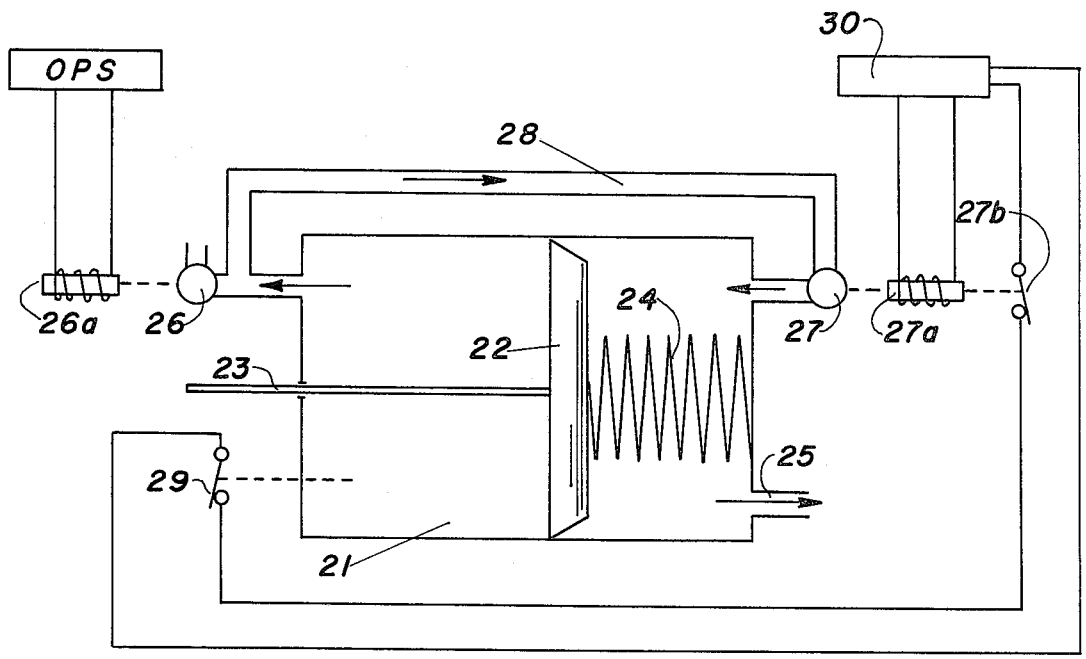
FIGS. 6a and 6b show the operating cylinder of FIG. 6 is two different operating positions.
Figure 6A:
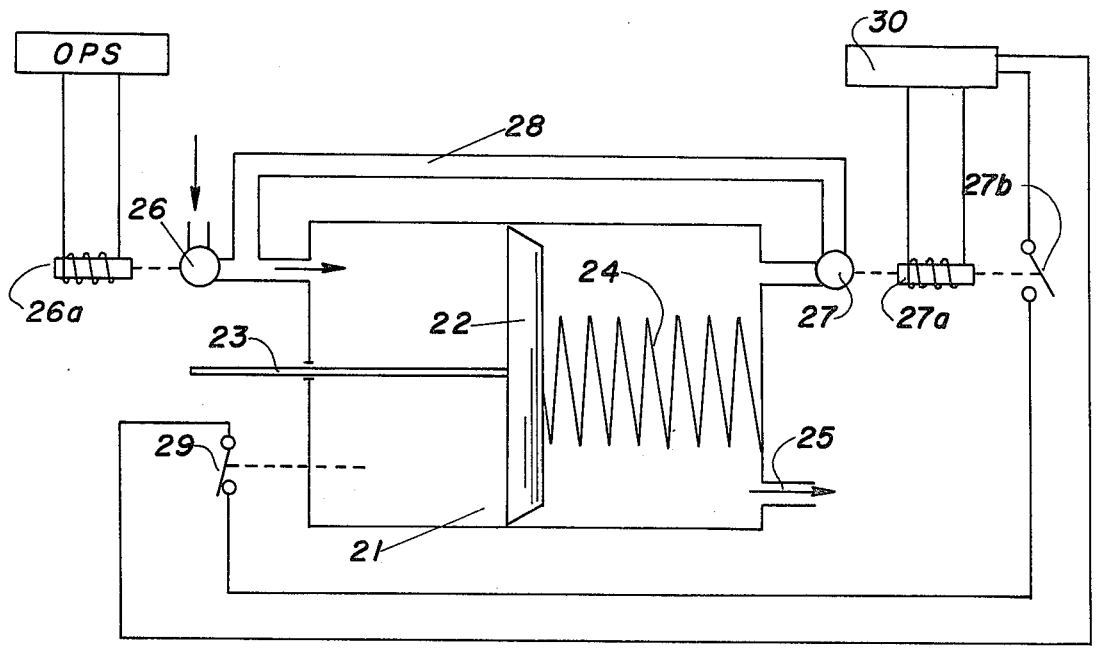

When piston 22 has reached its end position shown in FIG. 6b, it causes relief valve 27 to be opened and switch 27b to be closed. This causes the circuit for control switch 30 to be closed so as to energize solenoid 27a to keep valve 27 open. Piston rod 23 is connected with lever part 1'' carrying pedal 2 so that the movement of piston 22 moves this lever part into its idling position. This opens limit switch 12 and interrupts the operating power circuit controlled by master switch OPS (FIG. 5) so as to de-energize solenoid 26a of venting valve 26, closing this valve. Since relief valve 27 is opended simultaneously, as shown in FIG. 6b, interconnecting conduit 28 balances the pressure in the two cylinder chambers and spring 24 returns the piston to the rest position of FIG. 6. This again opens switch 29, interrupts the control circuit for switch 30 and de-energizes solenoid 27a, closing valve 27 and opening switch 27b. Thus, the cylinder is ready for a new cycle of operations.

Figure 7:
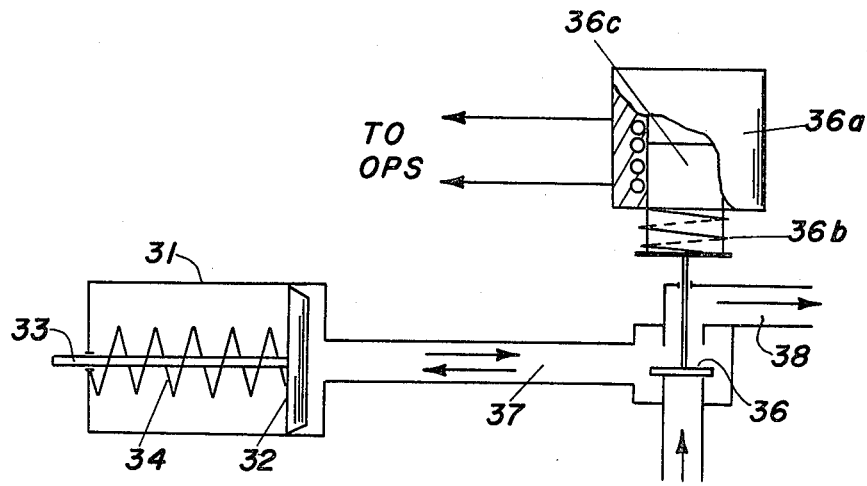
FIG. 7 shows a penumatic cylinder return means.

In the embodiment of FIGS. 7, pneumatic cylinder 31 is used to impart the return force to the operating lever. Piston 32 with piston rod 33 is arranged to glide in cylinder 31, the piston being biased by compression spring 34. Connecting conduit 37 connects one cylinder chamber to a source of compressed air supplied to the cylinder chamber by conduit 35 and venting conduit 38, control valve 36 being mounted between the compressed air supply conduit 35 and venting conduit 38 for alternate connection to connecting conduit 37. Valve 36 is operated by solenoid 36a energizable by operating power from the control circuit of FIG. 5 when master switch OPS is closed.

When this control circuit is closed in the manner described in connection with FIGS. 5, solenoid 36a is energized to open valve 36 and close venting conduit 38. This permits compressed air to flow into the cylinder chamber through conduits 35 and 37 and causes piston 32 to be pressed leftward against the bias of spring 34. Piston rod 33 is suitably connected to the operating lever to cause pedal 2 to be pivoted into its idling position. This interrupts the control circuit by opening switch 12 and thus de-energizes solenoid 36b, core 36c of the solenoid being pressed outwardly of solenoid core 36a by spring 36b into the illustrated position wherein valve 36 opens venting conduit 38 and closes compressed air supply conduit 35. Spring 34 will then urge piston 32 back into the rest position, readying the return mechanism for the next cycle.

Figure 8:
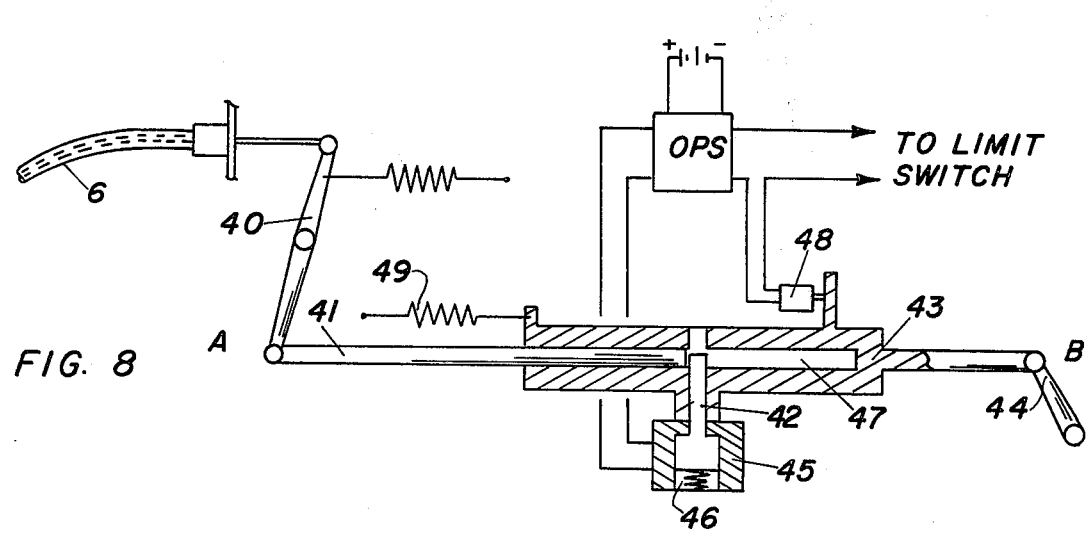
FIG. 8 shows another return means for the lever.
Figure 8A:
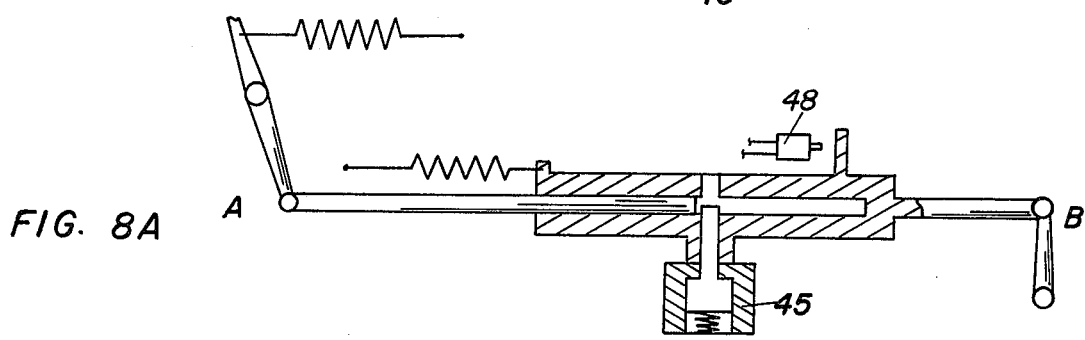
FIG. 8a and 8b show the return means of FIG. 8 in two different operating positions.
Figure 8B:
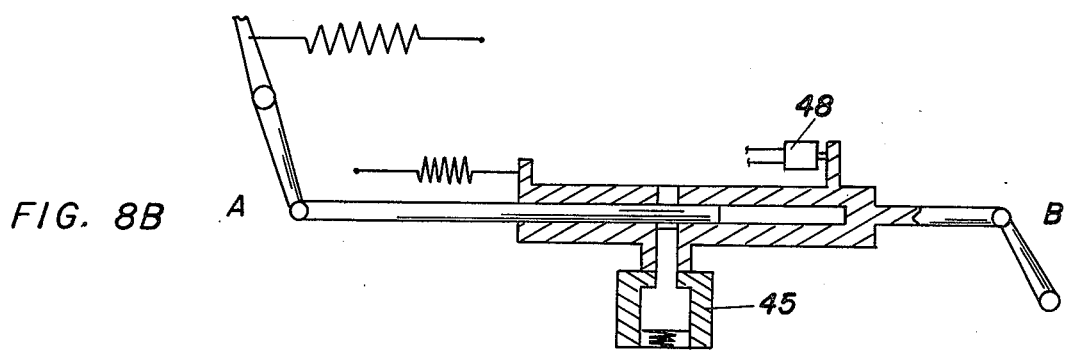

It is also possible to prevent simultaneous braking and acceleration by the operating mechanism of the present invention by changing the spacing or angle between the operating part and the part to be operated of the control of the motor. FIG. 8 shows an embodiment wherein the length of the linkage between points A and B is changed. Lateral pivoting of pedal 2 causes Bowden cable 6 to actuate intermediate lever 40 and to displace rod 41 in the direction of the arrow to produce motor speed control. Bolt 42 and guide 43 transmit this motion to lever 44 of the control. Bolt 42 is connected to the iron core of solenoid 45 which is affixed to guide 43. Spring 46 biases bolt 42 with the iron core into the upper position, thus closing bore 47 in guide 43. Switch 48 is operated by a nose of guide 43.

In the position illustrated in FIG. 8, limit switch 48 is open, this switch being closed when guide 43 and its nose are removed from the limit switch. Switch 48 is connected to limit switch 11 and master switch OPS. Limit switch 11 is closed when the pedal is depressed into braking position. If desired, limit switch 11 could be replaced by an oil pressure switch in the brake line. When the pedal is in its laterally pivoted motor speed control position and switch 48, is, therefore, closed, and braking is starting in this position of the pedal, the operating power control circuit is closed by limit switch 11 to energize solenoid 45, its iron core with bolt 42 is displaced against the bias of spring 46 and bore 47 is opened. Tensioned spring 49 causes guide 43 to be moved onto rod 41 and the control returns to the idling position while lever 40 and pedal 2 remain in the motor speed control position. Return of guide 43 into the idling position (FIG. 8) opens switch 48 and thus deenergizes the control circuit and the operating power circuit.

If pedal 2 is returned into its idling position and the original spacing between points A and B is thus restored, bolt 42 is moved by spring 46 in front of bore 47 and the motor control may be operated again. Thus, the brake may be operated in any position of the pedal, i.e. whether it is in the idling or motor speed control position, the motor speed control being operable only after the pedal has been returned to the idling position.

Figure 9:
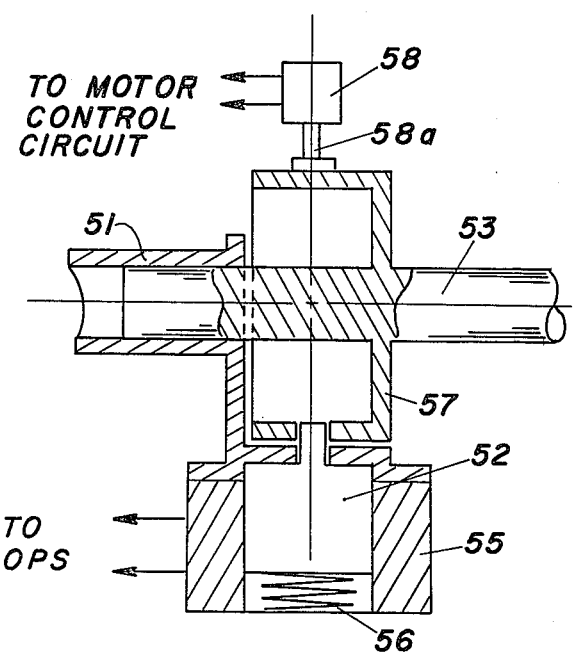
FIG. 9 is a top view, partly in section, of yet another embodiment for producing the force for the return of the lever.

Another embodiment based on the principle of changing a transmission element by means of a solenoid-operated bolt is shown in FIG. 9. In this embodiment, an intermediate shaft or the axle of the motor control is used to disconnect the motor from the operating lever.

In this embodiment, shaft 53 is rotatably journaled in the axial bore of hollow shaft 51, shaft 51 carries a drum segment and drum 57 is keyed to or integral with rotatable shaft 53. Iron core 52 carries a bolt and moves in solenoid coil 55, the bolt being biased into the locking position by spring 56. Switch 58 opens and closes the control circuit for the motor control.

Figure 10:
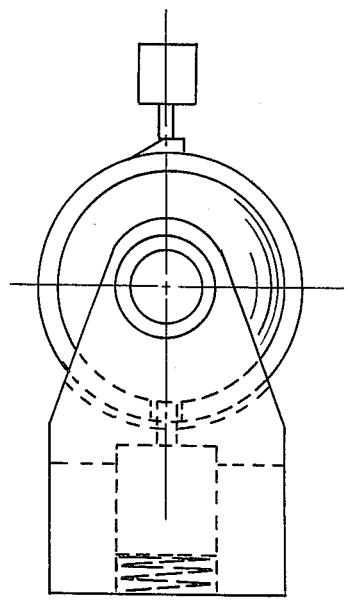
FIG. 10 is a side elevational view of the arrangement of FIG. 9.

Hollow shaft 51 is connected to operating lever 1 (see FIG. 1) by means of a lever and Bowden cable 6. Rotatable shaft 53 is directly connected with the motor control or linked thereto. FIGS. 9 and 10 show the idling 52 is In this position, the bolt projecting from iron core is pressed by spring 56 into a bore in drum 57. Switch 58 is open because switch contact 58a is raised by a boss on drum 57.

Figure 10A:
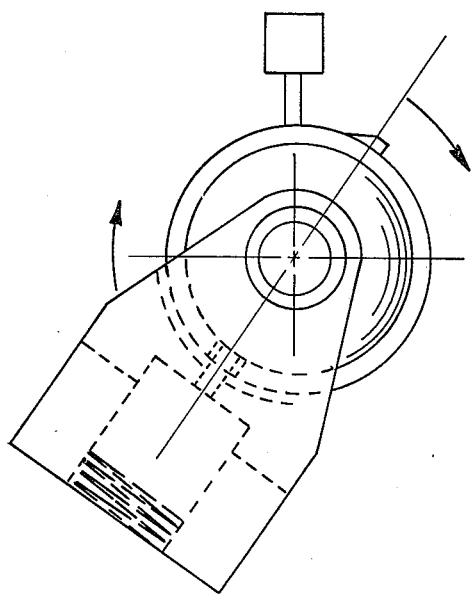
FIGS. 10a and 10b show two different operating positions of this arrangement.
Figure 10B:
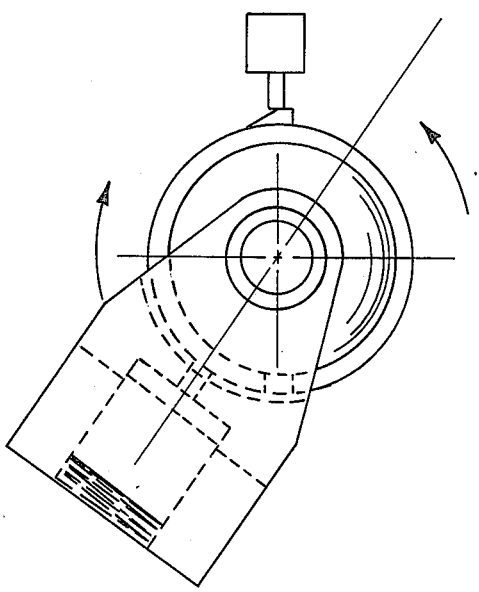

FIG. 10a shows this arrangement in the motor speed control position. In this position, shafts 51 and 53 have been rotated from their best position, shaft 53 being locked by the bolt to shaft 51 and thus being entrained by shaft 51. The angular movement of drum 57 causes the boss on the drum to move out of contact with switch contact 58a so that switch 58 is closed. If braking is initiated in this position (pedal laterally pivoted into its motor speed control position), limit switch 11 is closed to close the motor control circuit and the operating power circuit, master switch OPS being energized to energize solenoid coil 55 to move iron core 52 and displace its bolt out of the drum bore. A return spring of the motor control returns shaft 53 into its rest position while shaft 51 remains in the motor speed control position, with pedal 2 laterally pivoted (FIG. 10b). Switch 58 is opened again and solenoid coil 55 is de-energized. This causes spring 56 to press the bolt against the periphery of drum 57. When the pedal is pivoted back into its idling position (FIG. 10), the inwardly biased bolt will engage the bore in the drum to lock the two shafts for common rotation again and the motor control may be actuated again.

What is claimed is:

1. An operating mechanism for a motor vehicle, comprising a foot-operated brake and motor speed control lever, the lever being mounted for pivoting about a first axis into a position to brake the vehicle and for pivoting about a second axis extending transversely to the first axis, the lever being pivotal about the second axis between an idling position and motor speed control position, a return means for moving the lever from the motor speed control position to the idling position when the lever is pivoted about the first axis into the braking position, and two limit switches for actuating the return means upon simultaneously energizing a first one of the switches and de-energizing a second one of the switches.

2. The operating mechanism of claim 1, wherein the first limit switch is energized upon pivoting of the lever into the braking position and the second limit switch is energized in the motor speed control position of the lever.

3. The operating mechanism of claim 2, wherein the return means comprises a solenoid energized upon energization of one and de-energization of the second limit switch.

4. The operating mechanism of claim 2, wherein the return means comprises a vacuum operating cylinder actuated upon energization of one and de-energization of the second limit switch.

5. The operating mechanism of claim 2, wherein the return means comprises a pneumatic cylinder actuated upon energization of one and de-energization of the second limit switch.

6. The operating mechanism of claim 2, further comprising a motor speed control and a transmission between the lever and the control, the control, the transmission including two elements movable in respect of each other in one relative position and locked for common movement in another relative position, the two elements being biased into locking engagement in the other relative position, and the locking engagement being releasable upon pivoting of the lever to brake the vehicle and while the lever is in a position other than the idling position thereof.

7. The operating mechanism of claim 6, wherein the two elements are linearly displaceable in respect of each other.

8. The operating mechanism of claim 6, wherein the two elements are rotatable in respect of each other.

9. The operating mechanism of claim 6, further comprising two cooperating members for providing the locking engagement, and the second limit switch is actuatable by one of the members.

10. The operating mechanism of claim 6, wherein one of the transmission element is a sleeve and the other transmission element is a rod guided in the sleeve for linear displacement of the transmission elements in respect of each other.

11. The operating mechanism of claim 6, wherein one of the transmission elements is a hollow shaft having an axial bore and the other transmission element is a shaft being rotatably journaled in the bore of the hollow shaft for rotatable movement of the shafts in respect of each other.

* * * * *